United States Patent
Kimata et al.

(10) Patent No.: US 9,236,785 B2
(45) Date of Patent: Jan. 12, 2016

(54) REGULATOR OF VEHICLE AC GENERATOR

(75) Inventors: Hirotaka Kimata, Chiyoda-ku (JP);
Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 291 days.

(21) Appl. No.: 13/502,436

(22) PCT Filed: Nov. 20, 2009

(86) PCT No.: PCT/JP2009/069716
§ 371 (c)(1),
(2), (4) Date: Apr. 17, 2012

(87) PCT Pub. No.: WO2011/061852
PCT Pub. Date: May 26, 2011

(65) Prior Publication Data
US 2012/0200204 A1  Aug. 9, 2012

(51) Int. Cl.
*H02K 11/00* (2006.01)
*H02K 19/36* (2006.01)
*H02K 5/14* (2006.01)

(52) U.S. Cl.
CPC .............. *H02K 19/365* (2013.01); *H02K 5/141* (2013.01)

(58) Field of Classification Search
CPC ............................ H02K 19/365; H02K 5/141
USPC ..................................... 310/68 C, 68 D, 68 R
See application file for complete search history.

(56) References Cited

U.S. PATENT DOCUMENTS

| 6,301,096 | B1 | 10/2001 | Wozniczka |
| 7,141,900 | B2 * | 11/2006 | Nakamura et al. ........... 310/68 D |
| 8,022,585 | B2 * | 9/2011 | Oohashi ...................... 310/68 D |
| 2004/0155540 | A1 | 8/2004 | Nakamura et al. |
| 2006/0022544 | A1 * | 2/2006 | Kinashi ......................... 310/179 |
| 2007/0046113 | A1 * | 3/2007 | Mizuta et al. ................ 310/68 D |
| 2008/0238225 | A1 | 10/2008 | Oohashi |

FOREIGN PATENT DOCUMENTS

| CN | 1380954 A | 8/2005 |
| JP | 07023860 U | 5/1995 |
| JP | 2004-248354 A | 9/2004 |
| JP | 2004248354 A | 9/2004 |
| JP | 2006267128 A | 10/2006 |
| JP | 2008-245361 A | 10/2008 |

OTHER PUBLICATIONS

International Search Report for PCT/JP2009/069716 dated Jan. 12, 2010.

(Continued)

*Primary Examiner* — Hanh Nguyen
(74) *Attorney, Agent, or Firm* — Sughrue Mion, PLLC; Richard C. Turner

(57) ABSTRACT

A regulator of a vehicle AC generator is formed of an IC regulator of a mold package type and a regulator holder having an IC regulator mount portion. A press-fit fitting structure (140A, 230A, 140C, or 230D) is provided between an attachment plane of the IC regulator mount portion (110A) and an attachment plane of the IC regulator (200A) or between an inner wall surface of the IC regulator mount portion and an outer wall surface of the IC regulator.

4 Claims, 9 Drawing Sheets

(56) References Cited

OTHER PUBLICATIONS

Japanese Office Action, issued Oct. 8, 2013, Patent Application No. 2011-541772.

Chinese Office Action corresponding to Chinese Patent Application No. 200980162581.6, dated Jul. 15, 2014.

* cited by examiner (a)   (b)   (c)

(a)

(b)

(c)

REGULATOR OF VEHICLE AC GENERATOR

CROSS REFERENCE TO RELATED APPLICATIONS

This application is a National Stage of International Application No. PCT/JP2009/069716 filed Nov. 20, 2009, the contents of which are incorporated herein by reference in their entirety.

TECHNICAL FIELD

The present invention relates to a regulator that is a voltage control apparatus of a vehicle AC generator, and more particularly, to an IC regulator of a mold package type and an attachment structure of a regulator holder provided with an IC regulator mount portion.

BACKGROUND ART

A regulator that is a voltage control apparatus of a vehicle AC generator is furnished with a function of regulating an output voltage of a generator by controlling ON and OFF of a field current flown through a field winding.

Besides the voltage control function, regulators used recently are furnished with a communication function with an external in-vehicle device and a function of suppressing an abrupt rise in drive torque of a generator by making an increase in output current moderate when an electrical load increases. On the other hand, the mainstream of a voltage control circuit in the regulator is in the form of integrated circuit (IC) chips and an IC regulator of a mold package type in which a voltage control circuit and connection terminals of the voltage control circuit and an external circuit are molded integrally (see, for example, Patent Document 1) is used in some cases.

The IC regulator of the mold package type is mounted on a regulator holder having an integrally molded insert terminal to which a connection terminal of the IC regulator is joined. In this instance, in order to join the connection terminals at high reliability, it is necessary to position the connection terminals with respect to each other first and then to mechanically fix the IC regulator to the regulator holder.

Patent Document 1 describes an example where positioning is performed by bringing a protrusion provided to an IC regulator mount portion of the regulator holder into engagement with a through-hole provided to the IC regulator so that mechanical fixation is achieved.

RELATED ART DOCUMENT

Patent Document

Patent Document 1: JP-A-2004-248354 (FIG. 8 and FIG. 9)

SUMMARY OF THE INVENTION

Problems that the Invention is to Solve

According to the positioning method as above, however, there is only one engagement portion and a fitting structure is not adopted. Accordingly, positional displacement readily occurs after the IC regulator is supplied. In addition, because connection terminals provided to both of the IC regulator and the IC regulator mount portion have a narrow terminal width, the occurrence of positional displacement in a width direction makes it difficult to secure a joint area and therefore may possibly give rise to poor joint.

In order to fix the IC regulator completely, another process for example to deform the protrusion of the engagement portion is required and productivity is deteriorated. Also, the IC regulator is provided with a space to make the through-hole on the same plane as an IC regulator attachment surface outside the range of the IC regulator circuit. Accordingly, a plane size of the IC regulator main body becomes large and a large space has to be secured for the IC regulator mount portion.

The invention is devised to solve the problems discussed above and has an object to provide a regulator of a vehicle AC generator not only capable of enhancing attachment reliability and productivity of an IC regulator owing to achievement of high-accurate positioning and mechanical fixation simply by a press-fit process, but also capable of keeping a size of an attachment plane to a minimum without having to increase sizes of attachment planes of the IC regulator and an IC regulator mount portion.

Means for Solving the Problems

A regulator of a vehicle AC generator of the invention includes an IC regulator of a mold package type in which an IC chip portion forming a voltage control circuit and connection terminals of the IC chip portion and an external circuit are integrally molded, and a regulator holder having an IC regulator mount portion on which the IC regulator is mounted. A press-fit fitting structure is provided between an attachment plane of the IC regulator mount portion and an attachment plane of the IC regulator or between an inner wall surface of the IC regulator mount portion and an outer wall surface of the IC regulator.

Advantage of the Invention

According to the regulator of a vehicle AC generator of the invention, high-accurate positioning and mechanical fixation can be achieved simply by a press-fit process. It thus becomes possible to enhance attachment reliability and productivity of the IC regulator.

Also, a size of an attachment plane can be kept to a minimum without having to increase sizes of the attachment planes the IC regulator and the IC regulator mount portion. It thus becomes possible to reduce the cost owing to space saving in an IC regulator attachment surface.

The foregoing and other objects, features, aspects, and advantages of the present invention will become more apparent from the following detailed description of the present invention when taken conjunction with the accompanying drawings.

MODE FOR CARRYING OUT THE INVENTION

Figure 1:
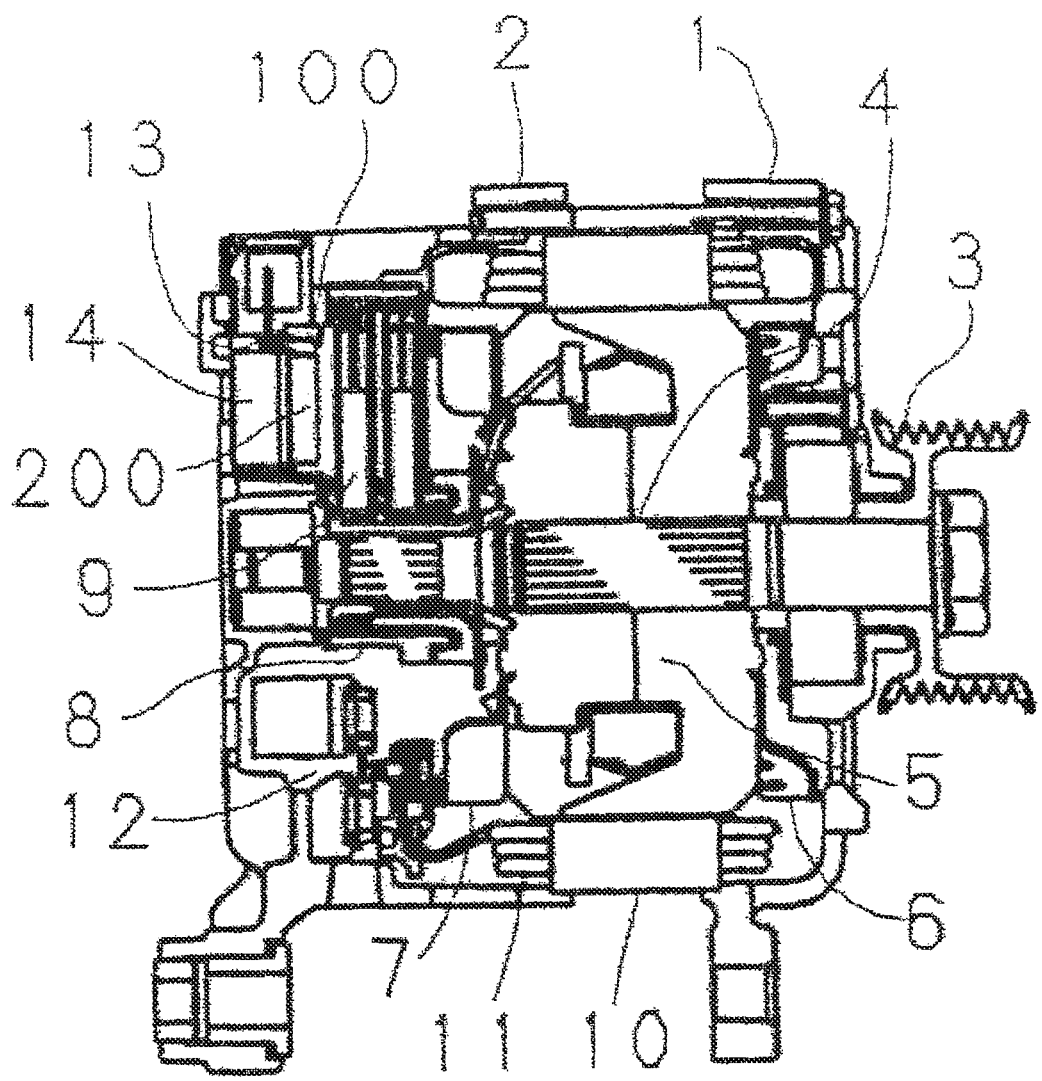
FIG. 1 is a schematic cross section showing an overall structure of a vehicle AC generator on which is mounted a regulator according to a first embodiment of the invention.

Hereinafter, an embodiment of the invention will be described with reference to the drawings. It should be appreciated that same reference numerals in the respective drawings denote the same or equivalent portions.

First Embodiment

Figure 2:
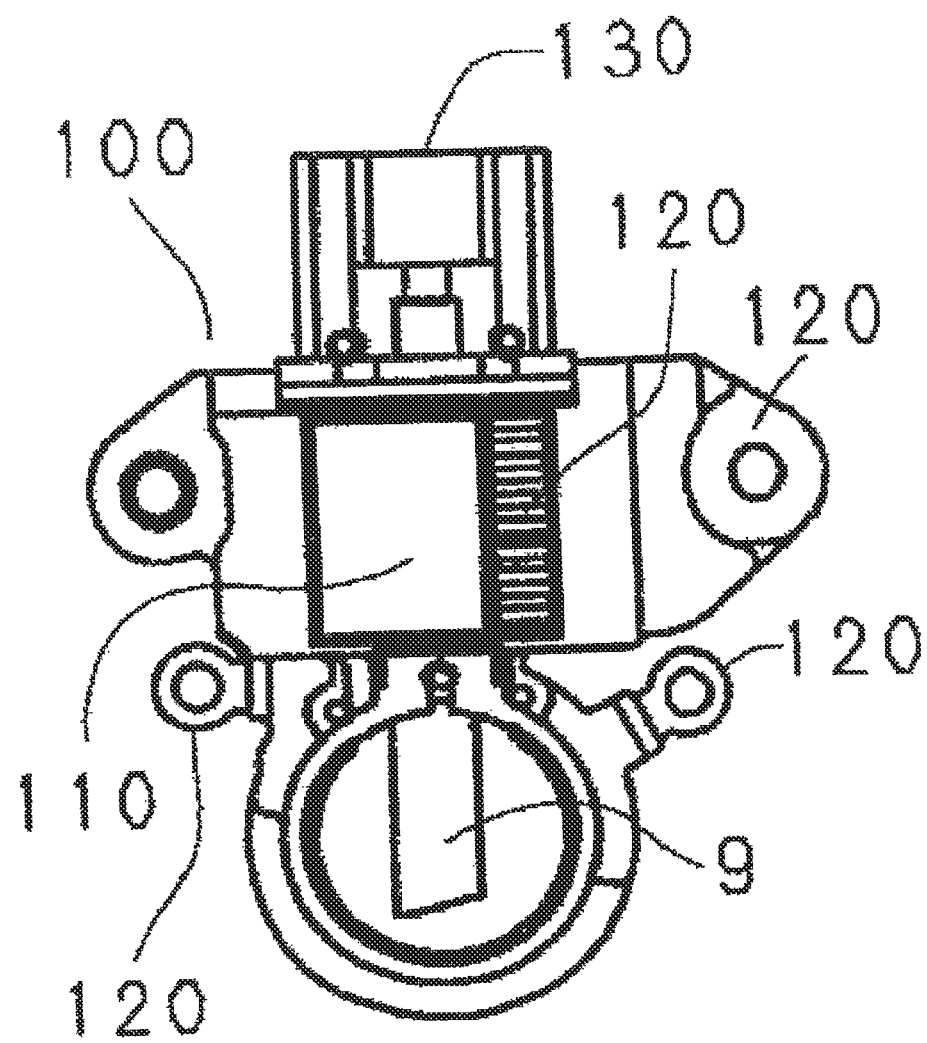
FIG. 2 is a plan view of a regulator holder according to the first embodiment of the invention.
Figure 3:
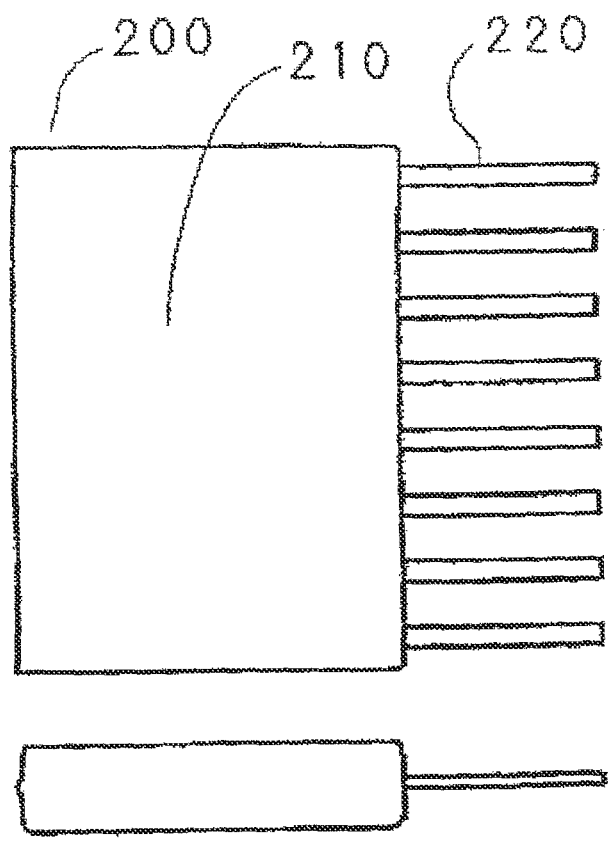
FIG. 3 is a plan view and a side view of an IC regulator of a mold package type.

FIG. 1 is a schematic cross section of a vehicle AC generator on which is mounted a regulator according to a first embodiment of the invention. FIG. 2 is a plan view of a regulator holder. FIG. 3 is a plan view and a side view of an IC regulator of a mold package type. Firstly, an overall structure of a vehicle AC generator will be described according to FIG. 1.

The vehicle AC generator has a front bracket 1 and a rear bracket 2, and on the inside of these brackets, a shaft 4 with a pulley 3 attached to one end, a claw pole rotor 5 attached to the shaft 4, a fan 6 and a fan 7 attached to the rotor 5 on the side of the front bracket 1 and on the side of the rear bracket 2, respectively, a slip ring 8 attached to the shaft 4 and used to supply a current to the rotor 5, a brush 9 sliding on the slip ring 8, a stator iron core 10 fixed to the front bracket 1 and the rear bracket 2, a stator coil 11 wound around the stator iron core 10, a rectifier 12 electrically connected to the stator coil 11 and rectifying an AC current generated in the stator coil 11 to a DC current, a regulator 13 adjusting an AC voltage generated in the stator coil 11, and a regulator cooling heat sink 14 attached to the regulator 13.

The regulator 13 is formed of a regulator holder 100 shown in FIG. 2 and an IC regulator 200 of a mold package type shown in FIG. 3.

As is shown in FIG. 2, the regulator holder 100 includes an IC regulator mount portion 110, an insert terminal 120 integrally molded with the regulator holder 100, a connector portion 130 connected to a vehicle-end connector, and the brush 9. One end of the insert terminal 120 is exposed inside the IC regulator mount portion 110 and the other end is disposed in a connection portion to the connector 130, the rectifier 12, and the rear bracket 2.

As is shown in FIG. 3, the IC regulator 200 is formed of an IC chip portion 210 and an IC regulator terminal 220 that are integrally molded using a mold. After the IC regulator 200 is housed in the IC regulator mount portion 110, the IC regulator terminal 220 is finally joined to the insert terminal 120 exposed inside the IC regulator mount portion 110.

Figure 4:
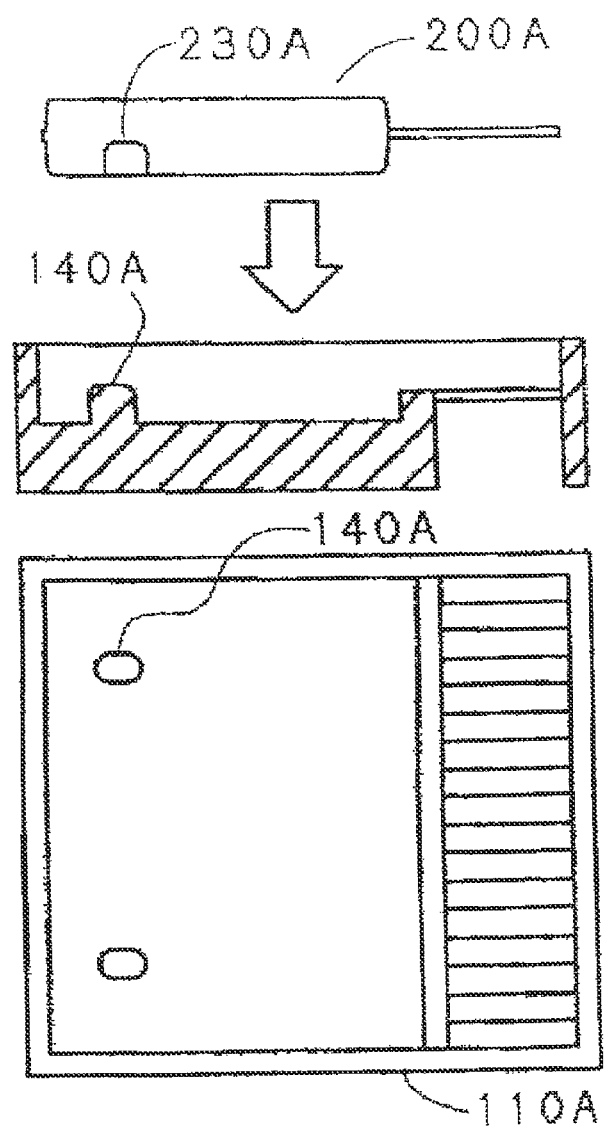
FIG. 4 is a view showing a first specific example of a fitting structure in an IC regulator mount portion according to the first embodiment of the invention.

A fitting structure of the IC regulator mount portion 110 and the IC regulator 200, which is a major portion of the invention, will now be described using FIG. 4 through FIG. 7. FIG. 4 shows an example of an IC regulator mount portion 110A that is the IC regulator mount portion 110 provided with at least one convex protrusion 140A within an attachment plane for the IC regulator 200, and an IC regulator 200A provided with at least one concave recess 230A on a contact surface to the IC regulator mount portion 110A.

The convex protrusion 140A and the concave recess 230A are of a structure to fit to each other and there is at least one contact portion. The protrusion 140A and the recess 230A can be set with a minor change of forming dies. Moreover, there is no need to change a plane size of the IC regulator mount portion 110 and a size of the attachment plane for the IC regulator 200. Hence, this structure has a cost advantage.

Figure 5:
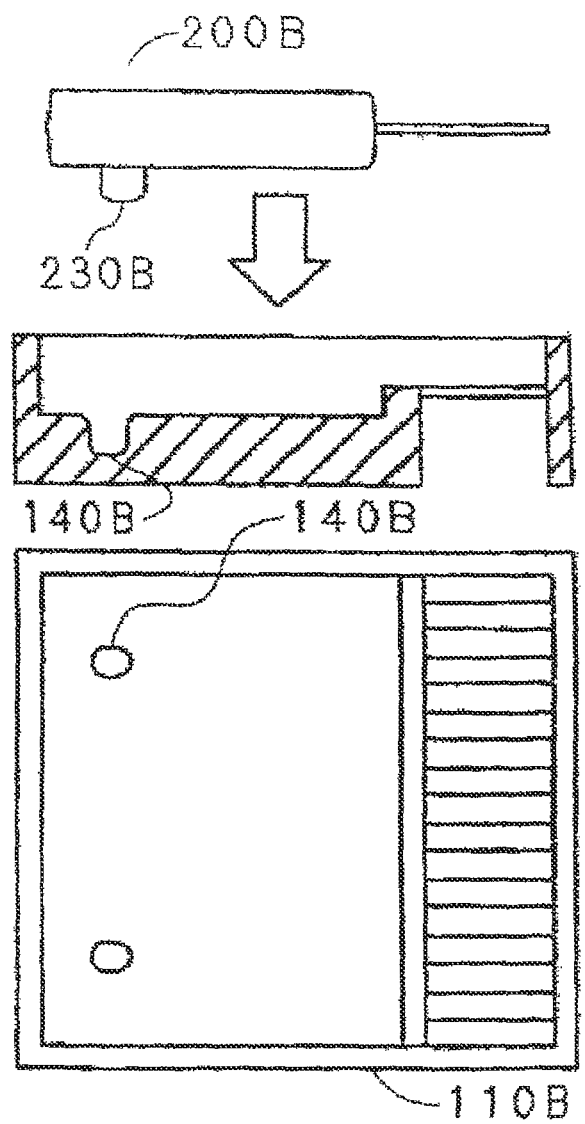
FIG. 5 is a view showing a second specific example of the fitting structure in the IC regulator mount portion according to the first embodiment of the invention.

FIG. 5 shows a second fitting structure and it shows an example of an IC regulator mount portion 110B that is the IC regulator mount portion 110 provided with at least one concave recess 140B within an attachment plane for the IC regulator 200, and an IC regulator 200B provided with at least one convex protrusion 230B on the side of a contact surface to the IC regulator mount portion 110B.

As with the protrusion 140A and the recess 230A described above, the recess 140B and the protrusion 230B are of a structure to fit to each other and there is at least one contact portion.

Also, as with the protrusion 140A and the recess 230A described above, the recess 140B and the protrusion 230B can be set with only a minor change of forming dies and a plane size of the IC regulator mount portion 110 and a size of the attachment plane for the IC regulator 200 remain unchanged.

Figure 6:
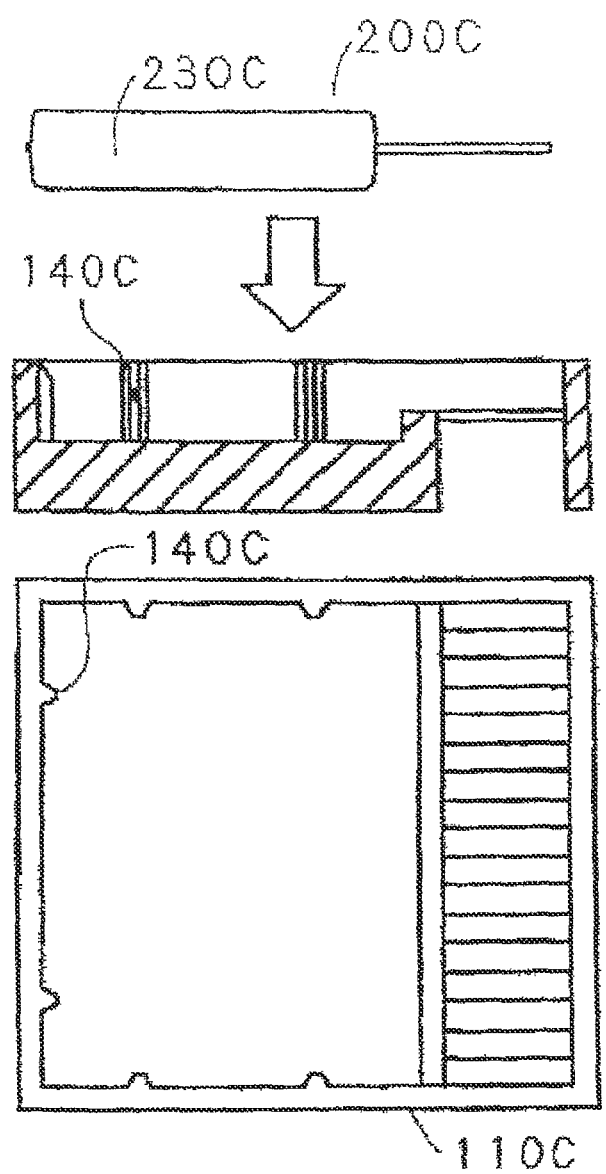
FIG. 6 is a view showing a third specific example of the fitting structure in the IC regulator mount portion according to the first embodiment of the invention.

FIG. 6 shows a third fitting structure and it shows an example of an IC regulator mount portion 110C that is the IC regulator mount portion 110 provided with at least one convex protrusion 140C on one or more surfaces of an inner wall thereof, and an IC regulator 200C to be attached to the IC regulator mount portion 110C.

The protrusion 140C is of a structure to fit to an outside wall 230C of the IC regulator 200C with respect to each other and there is at least one contact portion. The protrusion 140C can be set by only a minor change of a forming die of the IC regulator mount portion 110C. Also, a space is secured originally between the inner wall of the IC regulator mount portion 110 and the outer wall of the IC regulator 200 and the protrusion 140C is added in this space. Hence, a plane size of the IC regulator mount portion 110 and a size of the attachment plane for the IC regulator 200 remain unchanged.

Figure 7:
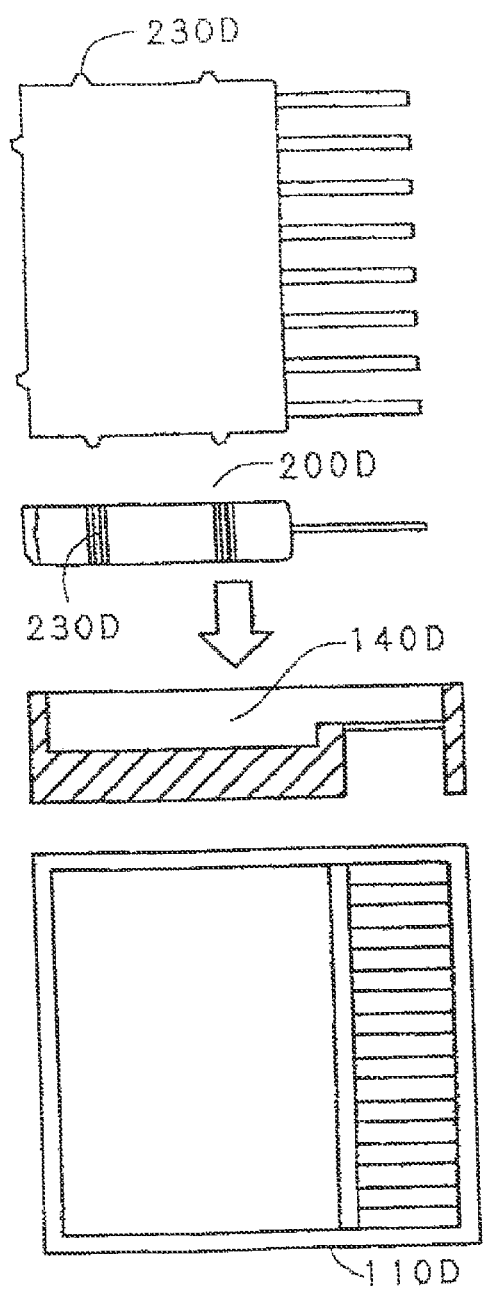
FIG. 7 is a view showing a fourth specific example of the fitting structure in the IC regulator amount portion according to the first embodiment of the invention.

FIG. 7 shows the third fitting structure and it shows an example of an IC regulator 200D that is the IC regulator 200 provided with at least one convex protrusion 230D on one or more surfaces of an outer wall thereof, and an IC regulator mount portion 110D.

The protrusion 230D is of a structure to fit to an inner wall 140D of the IC regulator mount portion 110D with respect to each other and there is at least one contact portion.

The protrusion 230D can be set with only a minor change of a forming die of the IC regulator 200D.

Because the protrusion 230D fits into a space between the inner wall of the IC regulator mount portion 110 and the outer wall of the IC regulator 200, a plane size of the IC regulator mount portion 110 remains unchanged.

As has been described, with a regulator of a vehicle AC generator according to a first embodiment of the invention, a protrusion or a recess for the use of fitting is provided to the IC regulator mount portion 110 and the IC regulator 200 or either one of these components and the press-fit fitting structure is formed between the attachment plane of the IC regulator mount portion and the attachment plane of the IC regulator, or between the inner wall surface of the IC regulator mount portion and the outer wall surface of the IC regulator. It thus becomes possible to achieve high-accurate positioning and the mechanical fixation of the both components simply by a press-fit process without having to change a plane space of the IC regulator mount portion 110. Hence, not only can attachment reliability and productivity of the IC regulator be enhanced, but also a size of attachment planes of the IC regulator and the IC regulator mount portion can be kept to a minimum. It thus becomes possible to save the cost owing to space saving in an IC regulator attachment surface.

The term, "fitting structure", referred to herein is not limited to a case where the both components have concave and convex shapes with respect to each other, and includes a case where either one of the components has a convex shape and the both components are planes.

Figure 8:
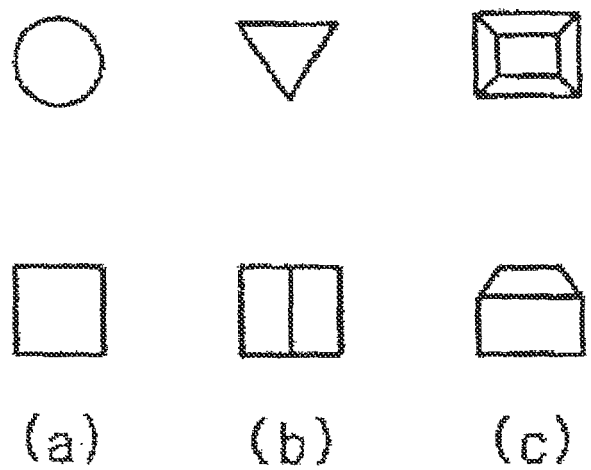
FIG. 8 is a view showing an example of shapes of a protrusion and a recess to form the fitting structure in attachment planes of the IC regulator mount portion and the IC regulator.
Figure 9:
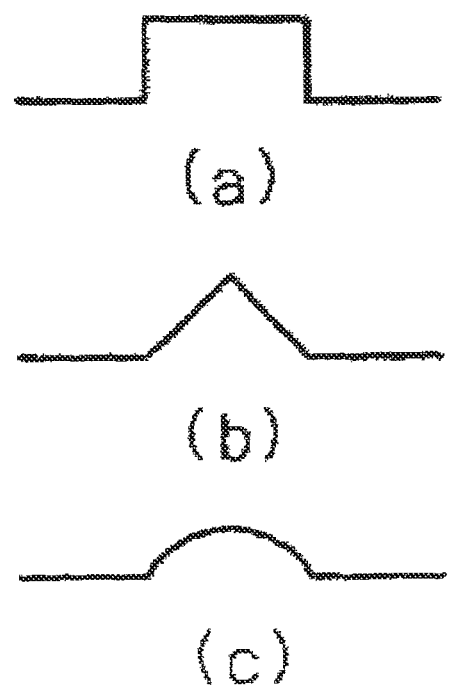
FIG. 9 is a view showing an example of shapes of a protrusion provided to an inner wall of the IC regulator mount portion and an outer wall of the IC regulator.

Shapes of the protrusion 140A and the recess 230A, the recess 140B and the protrusion 230B, the protrusion 140C, and the protrusion 230D are not limited to the shapes shown in FIG. 4 through FIG. 7 and the shapes can be changed arbitrarily. For example, the shapes of FIG. 4 and FIG. 5 may be shapes having a cross section of substantially a circular shape or a polygonal shape as are shown in FIG. 8. Also, the shapes of FIG. 6 and FIG. 7 may be shapes having a cross section of substantially an arc shape or a polygonal shape as are shown in FIG. 9.

Figure 10:
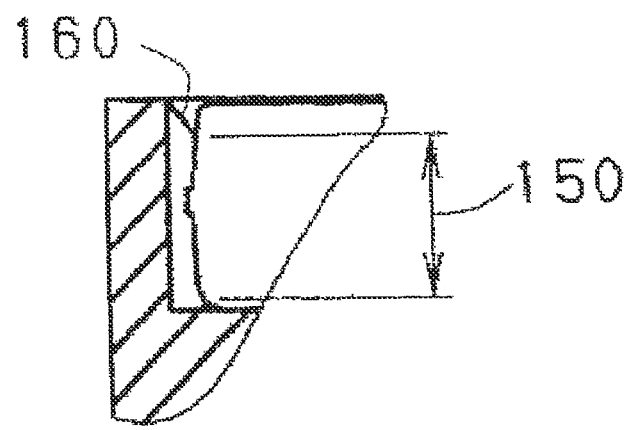
FIG. 10 is a view showing a fitting range of the fitting structure and a lead-in shape for the IC regulator according to the first embodiment of the invention.

Regarding the shapes of the protrusion 140A and the recess 230A, the recess 140B and the protrusion 230B, the protrusion 140C, and the protrusion 230D, as is shown in FIG. 10, it is preferable that a fitting range (a range across which the both components are in contact with each other by press-fitting) 150 secures at least one-fourth of a thickness of the IC regulator except where sufficient fixing strength is obtained.

Also, the protrusion 140C may be provided with an inclination 160 as is shown in FIG. 10 to have shape of the insertion guide for the IC regulator 200 at the time of attachment. An angle of the inclination 160 can be set arbitrarily.

Figure 11:
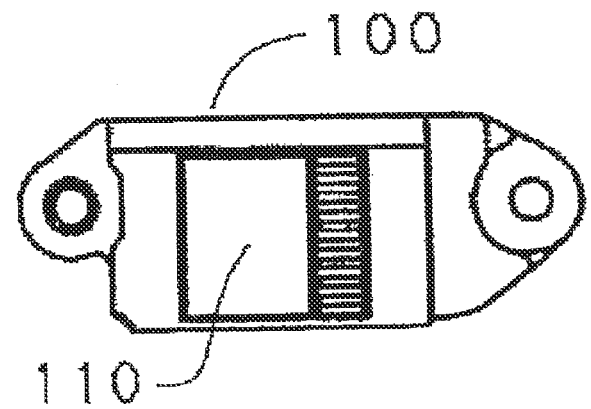
FIG. 11 is a view showing another example of the regulator holder to which the invention is applied.

Further, the invention is not limited to a regulator holder provided with the connector portion 130 and the brush 9 as is shown in FIG. 2. The invention is also applicable to a regulator holder of an arbitrary shape having the IC regulator mount portion 110 as an example of FIG. 11.

INDUSTRIAL APPLICABILITY

The invention is applied to an AC generator mounted on a vehicle.

DESCRIPTION OF REFERENCE NUMERALS AND SIGNS

1: front bracket
2: rear bracket
3: pulley
4: shaft
5: rotor
6: front fan
7: rear fan
8: slip ring
9: brush
10: stator iron core
11: stator coil
12: rectifier
13: regulator
14: heat sink
100: regulator holder
110, 110A, 110B, 110C, and 110D: IC regulator mount portion
120: insert terminal
130: connector portion
140A, 140B, 140C, and 140D: fitting portion on the regulator holder side
150: fitting range of regulator mount portion and IC regulator
160: insertion guide
200, 200A, 200B, 200C, and 200D: IC regulator
210: IC chip portion
220: IC regulator terminal
230A, 230B, 230C, and 240D: fitting portion on the IC regulator side

The invention claimed is:

1. A regulator of a vehicle AC generator comprising an IC regulator of a mold package type in which an IC chip portion forming a voltage control circuit and a plurality of connection terminals of the IC chip portion and an external circuit are integrally molded, and a regulator holder having an IC regulator mount portion on which the IC regulator is mounted, the regulator holder having a plurality of electrode terminals provided in parallel, the electrode terminals provided on one side of the IC regulator mount portion and connected to the plurality of connection terminals after the IC regulator is mounted to the IC regulator mount portion, characterized in that:
 a press-fit fitting structure is provided between an attachment plane of the IC regulator mount portion and an attachment plane of the IC regulator,
 wherein:
 the fitting structure is formed of a convex protrusion provided within the attachment plane of the IC regulator mount portion and a concave recess provided within the attachment plane of the IC regulator or formed of a concave recess provided within the attachment plane of the IC regulator mount portion and a convex protrusion provided within the attachment plane of the IC regulator;
 the fitting structures are provided in plural places separately from each other on the other side opposed to the one side having the electrode terminal of the IC regulator mount portion provided thereon; and
 the distance of separation between the plurality of fitting structures is arranged to be larger than the distance of separation between the plurality of electrode terminals.

2. The regulator of a vehicle AC generator according to claim 1, characterized in that:
 a shape of the protrusion provided to the attachment plane of the IC regulator has a cross section of substantially a circular shape or a polygonal shape.

3. The regulator of a vehicle AC generator according to claim 1, characterized in that:
 a shape of the protrusion provided to the IC regulator mount portion has a cross section of substantially a circular shape or a polygonal shape.

4. The regulator of a vehicle AC generator according to claim 1, characterized in that:
 the fitting structure secures a fitting range of at least one-fourth of a thickness of the IC regulator.

* * * * *